(12) United States Patent
Nakamura et al.

(10) Patent No.: US 11,162,558 B2
(45) Date of Patent: *Nov. 2, 2021

(54) TORSIONAL VIBRATION DAMPER

(71) Applicant: TOYOTA JIDOSHA KABUSHIKI KAISHA, Toyota (JP)

(72) Inventors: Taiki Nakamura, Zama (JP); Hideyuki Nishida, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,790

(22) Filed: Aug. 14, 2019

(65) Prior Publication Data

US 2020/0088264 A1 Mar. 19, 2020

(30) Foreign Application Priority Data

Sep. 14, 2018 (JP) .............................. JP2018-172273

(51) Int. Cl.
*F16F 15/14* (2006.01)
*F16F 15/121* (2006.01)
*B62D 25/08* (2006.01)

(52) U.S. Cl.
CPC .......... *F16F 15/145* (2013.01); *B62D 25/088* (2013.01); *F16F 15/1216* (2013.01); *F16F 15/1428* (2013.01)

(58) Field of Classification Search
CPC .. F16F 15/145; F16F 15/1216; F16F 15/1428; B62D 25/088
See application file for complete search history.

(56) References Cited

U.S. PATENT DOCUMENTS

| | | | | |
|---|---|---|---|---|
| 6,026,940 A | * | 2/2000 | Sudau | F16F 15/145 |
| | | | | 192/3.28 |
| 10,458,512 B2 | * | 10/2019 | Nishida | F16F 15/145 |
| 10,788,099 B2 | * | 9/2020 | Nakamura | F16F 15/1457 |
| 2013/0239745 A1 | | 9/2013 | Maienschein et al. | |
| 2016/0160959 A1 | | 6/2016 | Takikawa et al. | |
| 2016/0169318 A1 | * | 6/2016 | Miyahara | F16F 15/145 |
| | | | | 188/378 |

(Continued)

FOREIGN PATENT DOCUMENTS

CN 105 378 335 A 3/2016
CN 107 084 227 A 8/2017

(Continued)

OTHER PUBLICATIONS

Dec. 11, 2019 Office Action issued in U.S. Appl. No. 16/539,108.
Jun. 12, 2020 Notice of Allowance and Fee(s) Due issued in U.S. Appl. No. 16/539,108.

*Primary Examiner* — Vicky A Johnson
(74) *Attorney, Agent, or Firm* — Oliff PLC

(57) ABSTRACT

A torsional vibration damper in which collision noise resulting from collision of a rolling member against a rotary member is reduced. The torsional vibration damper comprises a restriction mechanism that establishes a restriction force in a direction to restrict the relative rotation between the rotary member and the inertia body, when the rolling member centrifugally pushed onto a raceway surface is pushed radially inwardly by the raceway surface toward a radially inner limit position of a guide section.

8 Claims, 14 Drawing Sheets

(56) References Cited

U.S. PATENT DOCUMENTS

| | | | |
|---|---|---|---|
| 2017/0234401 A1* | 8/2017 | Horita | F16F 15/145 |
| | | | 74/572.21 |
| 2017/0370402 A1 | 12/2017 | Pydin | |
| 2018/0119773 A1* | 5/2018 | Nishida | F16F 15/145 |
| 2018/0306272 A1* | 10/2018 | Tomiyama | F16F 15/1457 |
| 2019/0048972 A1* | 2/2019 | Iwagaki | F16F 15/1457 |
| 2019/0285136 A1* | 9/2019 | Ishibashi | F16F 15/3156 |
| 2019/0323576 A1 | 10/2019 | Nishikawa | |

FOREIGN PATENT DOCUMENTS

| | | |
|---|---|---|
| CN | 107 532 677 A | 1/2018 |
| DE | 10 2010 052 388 A1 | 6/2011 |
| EP | 3211265 A1 | 8/2017 |
| JP | 5783542 B2 | 9/2015 |
| JP | 2017-002913 A | 1/2017 |
| JP | 2017-031995 A | 2/2017 |
| JP | 6076570 B1 | 2/2017 |
| JP | 2017-145857 A | 8/2017 |
| JP | 2018-132160 A | 8/2018 |

* cited by examiner

TORSIONAL VIBRATION DAMPER

CROSS-REFERENCE TO RELATED APPLICATIONS

The present invention claims the benefit of Japanese Patent Application No. 2018-172273 filed on Sep. 14, 2018 with the Japanese Patent Office, the disclosure of which is incorporated herein by reference in its entirety.

BACKGROUND

Field of the Disclosure

The present invention relates to a torsional vibration damper that damps torsional vibration resulting from a torque pulse, and more particularly, to a torsional vibration damper that damps torsional vibration by an oscillating motion of an inertia body relative to a rotary member.

Discussion of the Related Art

US 2017/0234401 A1 describes a torsional vibration damper that damps a torsional vibration resulting from a torque pulse by a centrifugal pendulum motion of a mass. The torsional vibration damper taught by US 2017/0234401 A1 comprises: a rotating body rotated by a torque applied thereto; and an inertial body that is disposed radially outside of the rotating body in such a manner as to rotate relative to the rotating body in response to pulsation of the torque. A plurality of guide grooves are formed on a circumference of the rotating body at regular intervals in the circumferential direction to protrude radially outwardly, and a rolling body is held in each of the guide grooves. That is, the rolling bodies individually connecting the rotary member to the inertia body in such a manner as to allow the inertial body to oscillate relative to the rotating body.

Specifically, a plurality of raceway surfaces are formed on an inner circumferential portion of the inertial body, and each of the rolling bodies held in the guide grooves of the rolling body is centrifugally pushed onto the raceway surface of the inertial body. A curvature radius of each of the raceway surfaces is shorter than a curvature radius of an outer circumference of the rotating body. When the rotating body is rotated at a high speed without being subjected to the torque pulse, the rolling body is pushed onto a radially outermost portion of the raceway surface. That is, the rolling body is situated at a neutral position on the raceway surface.

In this situation, if torque pulse occurs, the rotating body is accelerated while the inertial body is rotated inertially at a previous speed. Consequently, the inertial body is oscillated relative to the rotating body, and the raceway surface of the inertial body is displaced from the rolling body. That is, a contact point of the rolling body to the raceway surface is displaced in a circumferential direction. In this situation, the rolling body is returned to the neutral position by a torque resulting from a deviation of a normal line of the rolling body from a direction of application of the centrifugal force. As a result, torsional vibrations resulting from pulsation of the torque applied to the rotating body are damped by such torque returning the rolling body.

When a rotational speed of the rotating body is reduced to a level at which an attraction of gravity overwhelms the centrifugal force, the rolling bodies and the inertial body drops gravitationally and collide against the rotating body. Consequently, collision noises are generated in the torsional vibration damper. In order to reduce such noise, JP-A-2017-31995 describes a torsional vibration damper in which a width of the guide groove holding the rolling body is reduced toward an opening. In the torsional vibration damper taught by JP-A-2017-31995, therefore, the rolling body is gravitationally brought into contact with a rounded bottom surface of the guide groove before comes into contact with a width end of a raceway surface, when a rotating body is rotated at a low speed.

In the torsional vibration dampers of these kinds, each of the rolling member is allowed to move radially between the raceway surface of the inertial body and the bottom of the guide groove of the rotating body, and as described, a curvature radius of the raceway surface is shorter than that of the outer circumference of the rotating body. Therefore, when the inertial body oscillates relative to the rotating body, the rolling body is displaced radially inwardly by the raceway surface. In this situation, if a rotational speed of the rotating body is higher than a certain level, the rolling body may be centrifugally pushed onto the raceway surface. However, when the rotating body is just started to be rotated, or just before stopped, the rolling body may be gravitationally isolated from the raceway surface and brought into contact again to the raceway surface. Otherwise, the rolling body drops gravitationally and comes into contact with the bottom surface of the guide groove. As a result, collision noise is generated in the torsional vibration damper. Thus, conventional torsional vibration dampers have to be improved to reduce the above-explained collision noise.

SUMMARY

The present invention has been conceived noting the above-described technical problems, and it is therefore an object of the present invention to reduce collision noise in a torsional vibration damper resulting from collision of a rolling member against a rotary member.

According to at least one embodiment of the present disclosure, there is provided a torsional vibration damper comprising: a rotary member that is rotated by a torque applied thereto; an inertia body that oscillates relatively to the rotary member in response to a change in the torque so as to suppress torsional vibrations resulting from the change in the torque; a rolling member that is rotated with the rotary member while being displaced radially outwardly by a centrifugal force; a guide section that is formed on the rotary member to hold the rolling member, while allowing the rolling member to move radially outwardly from a predetermined radially inner limit position of the guide section but restricting the rolling member to move in a circumferential direction; and a raceway surface as an arcuate surface formed on the inertia body to which the rolling member is centrifugally brought into contact. The raceway surface is adapted to push the rolling member toward a radially inner limit position against the centrifugal force when a relative rotation between the rotary member and the inertia body is caused. In order to achieve the above-explained objective, according to at least one embodiment of the present disclosure, the torsional vibration damper is provided with a restriction mechanism that establishes a restriction force in a direction to restrict the relative rotation between the rotary member and the inertia body, when the rolling member centrifugally pushed onto the raceway surface is pushed radially inwardly by the raceway surface toward the radially inner limit position of the guide section.

In a non-limiting embodiment, the restriction mechanism may include: a first contact portion that is formed on the rotary member while being oriented to a rotational direction of the rotary member; and a second contact portion that is opposed to the first contact portion while maintaining a predetermined clearance from the first contact portion to be brought into contact with the first contact portion, when the relative rotation between the rotary member and the inertia body is caused so that the rolling member is pushed radially inwardly by the raceway surface. The predetermined clearance between the first contact portion and the second contact portion may be narrower than a required distance of a relative rotation between the first contact portion and the second contact portion to push the rolling member to the radially inner limit position of the guide section by the raceway surface that is governed by an angle of the relative rotation between the rotary member and the inertia body.

In a non-limiting embodiment, the guide section may be formed on an outer circumference of the rotary member to protrude radially outwardly. The inertia body may include a cutout that holds the guide section, and the cutout may include a side surface opposed to the guide section in the rotational direction of the rotary member. A side surface of the guide section held in the cutout may serve as the first contact portion, and the side surface of the cutout opposed to the side surface of the guide section may serve as the second contact portion. At least one of the first contact portion and the second contact portion may comprise an adapter protruding toward the other one of the first contact portion and the second contact portion.

In a non-limiting embodiment, the adapter may be made of elastic material.

In a non-limiting embodiment, the adapter may include a stopper portion that is brought into contact with a part of the rolling member thereby maintaining the rolling member to a position away from the radially inner limit position of the guide section.

In a non-limiting embodiment, the restriction mechanism may be arranged between the rotary member and the inertia body. The restriction mechanism may include an elastic member that establishes elastic force in a direction to reduce an angle of relative rotation between the rotary member and the inertia body when the relative rotation between the rotary member and the inertia body is caused.

According to another embodiment of the present disclosure, there is provided a torsional vibration damper comprising: a rotary member that is rotated by a torque applied thereto; an inertia body that oscillates relatively to the rotary member in response to a change in the torque so as to suppress torsional vibrations resulting from the change in the torque; a guide groove having a bottom surface at a predetermined radial position, that is formed on an outer circumference of the rotary member to protrude radially outwardly; a rolling member that is rotated with the rotary member while being displaced radially outwardly by a centrifugal force, and that includes a shaft portion held in the guide groove while being allowed to move in a radial direction but restricted to move in a rotational direction of the rotary member, and a pair of weight portions formed on both ends of the shaft portion; and a raceway surface as an arcuate surface formed on the inertia body to which the rolling member is centrifugally brought into contact. The raceway surface is adapted to push the rolling member toward the bottom surface of the guide groove against the centrifugal force when a relative rotation between the rotary member and the inertia body is caused. In order to achieve the above-explained objective, according to another embodiment of the present disclosure, the torsional vibration damper is provided with a buffer member that is attached to any one of the rotary member and the inertia body to maintain the rolling member to a position away from the bottom surface of the guide groove, when the rolling member centrifugally pushed onto the raceway surface is pushed radially inwardly by the raceway surface toward the bottom surface of the guide groove.

According to still another embodiment of the present disclosure, there is provided a torsional vibration damper comprising: a rotary member that is rotated by a torque applied thereto; an inertia body that oscillates relatively to the rotary member in response to a change in the torque so as to suppress torsional vibrations resulting from the change in the torque; a guide groove having a bottom surface at a predetermined radial position, that is formed on an outer circumference of the rotary member to protrude radially outwardly; a rolling member that is rotated with the rotary member while being displaced radially outwardly by a centrifugal force, and that includes a shaft portion held in the guide groove while being allowed to move in a radial direction but restricted to move in a rotational direction of the rotary member, and a pair of weight portions formed on both ends of the shaft portion; and a raceway surface as an arcuate surface formed on the inertia body to which the rolling member is centrifugally brought into contact. The raceway surface is adapted to push the rolling member toward the bottom surface of the guide groove against the centrifugal force when a relative rotation between the rotary member and the inertia body is caused. In order to achieve the above-explained objective, according to still another embodiment of the present disclosure, the shaft portion has a circular cross-section; the bottom surface is shaped into an arcuate surface; and a curvature radius of the bottom surface is identical to a curvature radius of an outer circumferential surface of the shaft portion.

According to yet another embodiment of the present disclosure, there is provided a torsional vibration damper comprising: a rotary member that is rotated by a torque applied thereto; an inertia body that oscillates relatively to the rotary member in response to a change in the torque so as to suppress torsional vibrations resulting from the change in the torque; a guide groove having a bottom surface at a predetermined radial position, that is formed on an outer circumference of the rotary member to protrude radially outwardly; a rolling member that is rotated with the rotary member while being displaced radially outwardly by a centrifugal force, and that includes a shaft portion held in the guide groove while being allowed to move in a radial direction but restricted to move in a rotational direction of the rotary member, and a pair of weight portions formed on both ends of the shaft portion; and a raceway surface as an arcuate surface formed on the inertia body to which the rolling member is centrifugally brought into contact. The raceway surface is adapted to push the rolling member toward the bottom surface of the guide groove against the centrifugal force when a relative rotation between the rotary member and the inertia body is caused. In order to achieve the above-explained objective, according to yet another embodiment of the present disclosure, a clearance between the shaft portion and the bottom surface of a case in which the relative rotation between the rotary member and the inertia body is not caused and the rolling member is centrifugally pushed onto the raceway surface is set wider than a total distance of: a minimum clearance between the rotary member and the inertia body situated concentrically with each other measured in a direction parallel to a moving direction of the rolling member; and a maximum displacement of the rolling member pushed toward the bottom surface by the raceway surface.

In the torsional vibration damper according to the embodiments of the present disclosure, the rolling member centrifugally pushed onto the raceway surface is pushed back radially inwardly by the raceway surface in accordance with a relative rotation between the rotary member and the inertia body. However, the restriction force to restrict the relative rotation between the rotary member and the inertia body is established and increased with an increase in the angle of the relative rotation, before the rolling member is brought into contact with the radially inner limit position of the guide section. According to the embodiments of the present disclosure, therefore, collision impact and noise resulting from collision of the rolling member against the guide section can be reduced.

Specifically, the relative rotation between the rotary member and the inertia body is restricted when the first contact portion and the second contact portion come into contact with each other. In this situation, although the rolling member centrifugally pushed onto the raceway surface is pushed radially inwardly by the raceway surface, the rolling member will not reach the radially inner limit position of the guide section. For this reason, collision noise resulting from collision of the rolling member against the guide section can be reduced.

The collision noises of the first contact portion and the second contact portion may be reduced by the adapter made of elastic material.

If the relative rotation between the rotary member and the inertia body is caused abruptly, a pushing force of the raceway surface to push the rolling member radially inwardly may be increased to bring the rolling member into contact with the radially inner limit position of the guide section. In this situation, however, the rolling member is maintained to the position away from the radially inner limit position of the guide section by the buffer member made of elastic material. For this reason, collision noise resulting from collision of the rolling member against the guide section can be reduced.

In addition, since the shaft portion of the rolling member held in the guide groove is rounded and the bottom surface of the guide groove is shaped into an arcuate surface whose curvature radius is identical to that of the shaft portion, a contact area between the shaft portion and the bottom surface can be enlarged. For these reasons, a stress concentration is relaxed and a contact pressure between the rolling member and the bottom surface of the guide groove is reduced to limit damage on those members.

In the torsional vibration damper according to the embodiment of the present disclosure, the rolling member is pushed radially inwardly not only by the raceway surface but also by the inertia body dropping gravitationally. However, when the relative rotation between the rotary member and the inertia body is not caused, the clearance between the shaft portion and the bottom surface is maintained wider than the total distance of the displacement of the rolling member toward the bottom surface of the guide groove. For this reason, the rolling member will not come into contact with the bottom surface of the guide groove even if pushed radially inwardly by the raceway surface, and hence the collision noise can be reduced.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
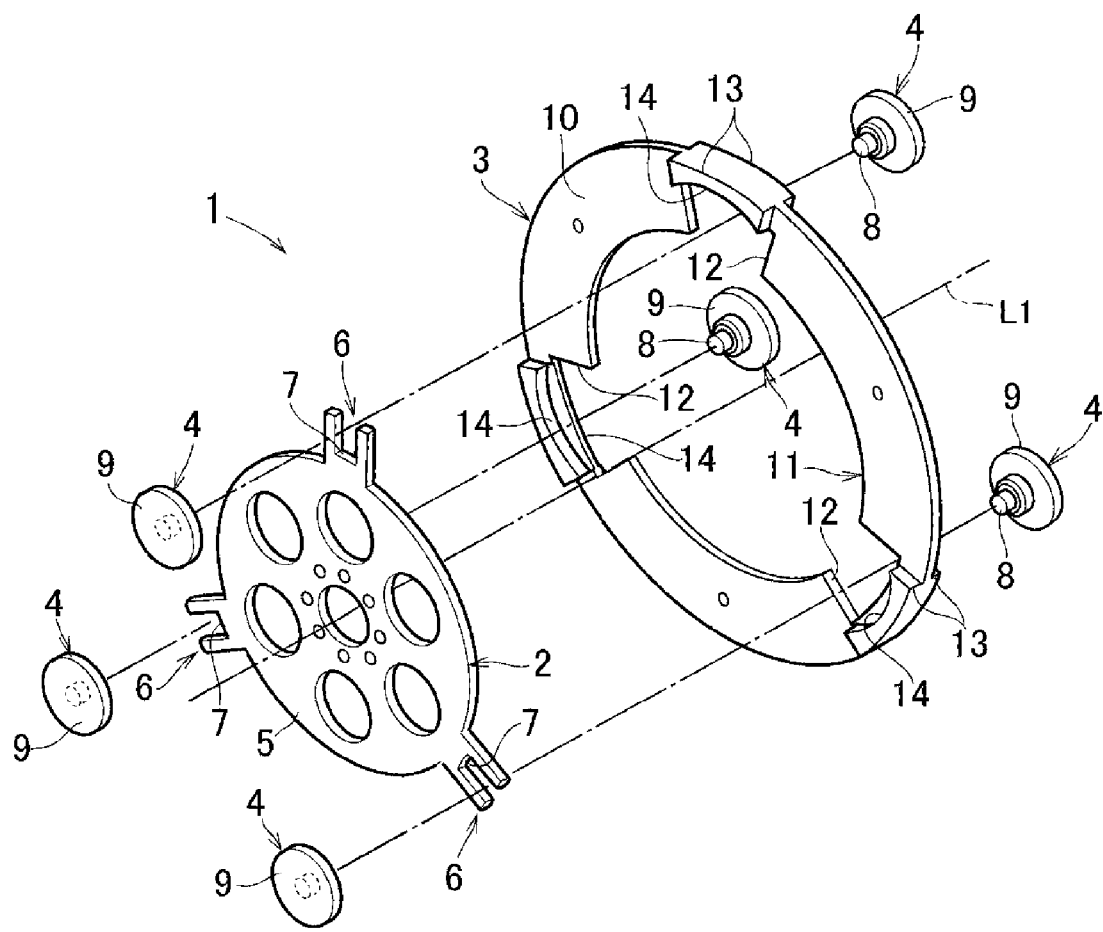
FIG. 1 is a perspective view showing one example of a torsional vibration damper according to an exemplary embodiment of the present disclosure.

Preferred embodiments of the present invention will now be explained with reference to the accompanying drawings. Referring now to FIG. 1 there is shown one example of a torsional vibration damper 1 according to an exemplary embodiment of the present invention. As shown in FIG. 1, a torsional vibration damper 1 comprises a rotary member 2, an inertia body 3, and a plurality of rolling members 4. The rotary member 2 is rotated by a torque delivered from a prime mover of a vehicle around a rotational center axis L1. For example, the torsional vibration damper 1 may be mounted on a crankshaft of an engine, a propeller shaft that transmits the torque to a wheel, or an axle shaft of the vehicle (neither of which are shown). The rotary member 2 is oscillated by pulsation of the torque applied thereto.

The rotary member 2 comprises a disc-shaped first plate 5 as a main body of the rotary member 2. According to the embodiment shown in FIG. 1, a plurality of holes are formed on the first plate 5 so as to reduce a weight of the rotary member 2. A plurality of guide section 6 as a guide groove are formed on a circumference of the first plate 5 at regular intervals in the circumferential direction. The rolling member 4 is held in each of the guide section 6 while being allowed to move in the radial direction but restricted to oscillate in the circumferential direction. Specifically, the guide section 6 comprises a pair of guide walls protruding radially outwardly from the first plate 5, and a bottom surface 7 as a radially inner limit position of the rolling member 4 that is formed between the guide walls. That is, the rolling member 4 is held between the guide walls. Although the number of guide sections 6 is described as three in FIG. 1, the present disclosure is not limited to this, and there may be four or more, for example, or there may be two.

Figure 2:
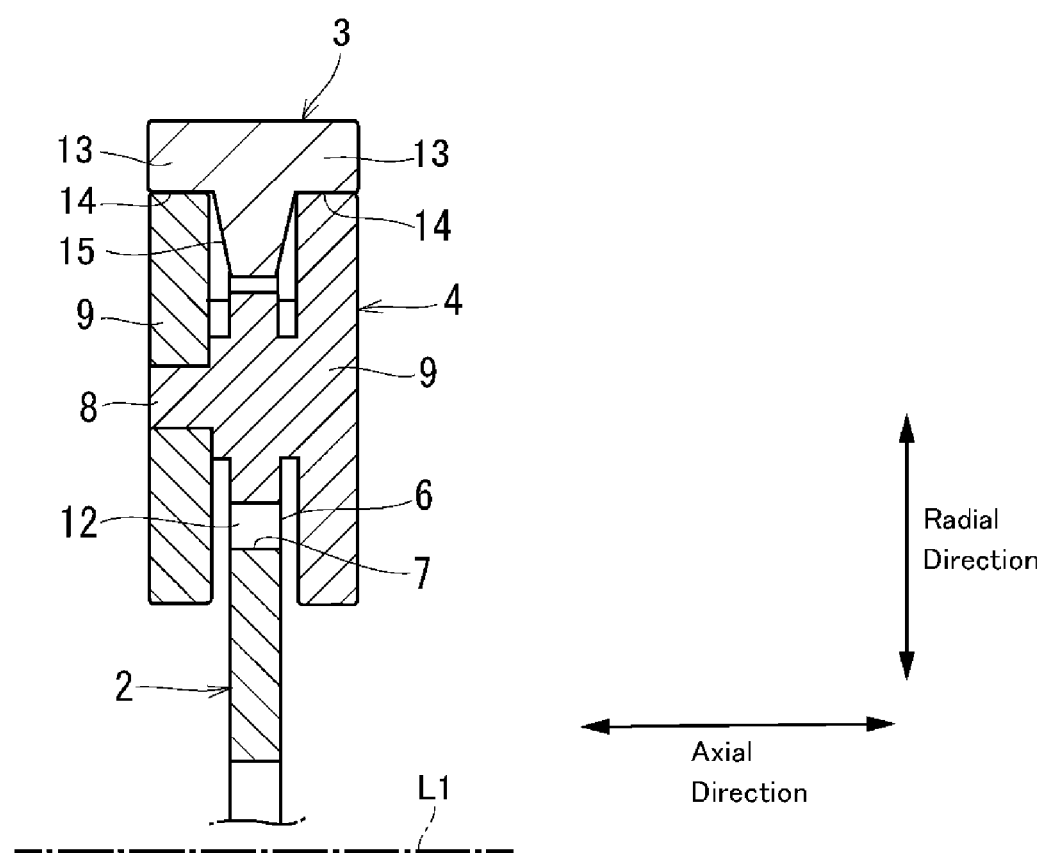
FIG. 2 is a partial cross-sectional view of the torsional vibration damper showing cross-sections of the rotary member, the inertia body, and the rolling member.
Figure 3:
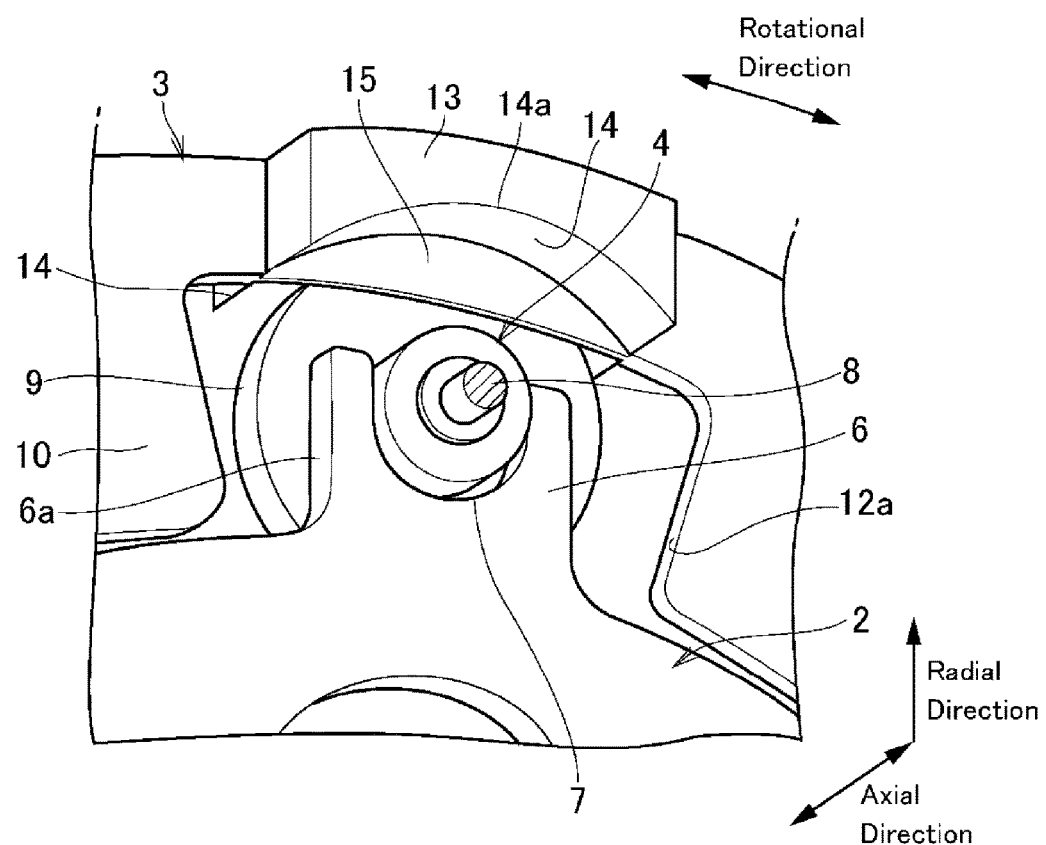
FIG. 3 is a partial perspective view showing a cutout of the inertia body shown in FIG. 2 in an enlarged scale.

When the rotary member 2 is rotated, each of the rolling members 4 is displaced radially outwardly by centrifugal force, and individually brought into contact with raceway surfaces formed in the inertia body 3. As shown in FIG. 2, the rolling member 4 comprises a shaft portion 8 held between the guide walls of the guide section 6, and a pair of diametrically large sections 9 as a weight formed on both ends of the shaft portion 8. An outer diameter of the shaft portion 8 is slightly smaller than a groove width between the guide walls of the guide section 6, and a length of the shaft portion 8 is longer than a thickness of the rotary member 2. Therefore, the rolling member 4 is allowed to move smoothly in the radial direction between the guide walls of the guide section 6 without bringing inner faces of the diametrically large sections 9 into contact with the rotary member 2. When a rotational speed of the rotary member 2 is reduced, the rolling member 4 drops gravitationally and comes into contact with the bottom surface 7 of the guide section 6. In order to relax a stress concentration and reduce a contact pressure between the rolling member 4 and the bottom surface 7 of the guide section 6, it is preferable to round the bottom surface 7 to fit to an outer shape of the shaft portion 8 of the rolling member 4. That is, the shaft portion 8 is configured having a circular cross-section, and the bottom surface 7 is shaped into an arcuate surface. To this end, it is especially preferable to adjust a curvature radius of the bottom surface 7 of the guide section 6 to a curvature radius of a cross-section of the shaft portion 8 of the rolling member 4. In other words, the curvature radius of the bottom surface 7 is identical to the curvature radius of an outer circumferential surface of the shaft portion 8. Consequently, a contact area between the rolling member 4 and the bottom surface 7 of the guide section 6 is widened to limit damages on the guide section 6 and the rolling member 4.

As illustrated in FIG. 2, the rolling member 4 is formed with a substantially H-shaped cross-section. In order to allow the rolling member 4 to move and rotate smoothly in the guide section 6, it is preferable to reduce frictional resistance between the rolling member 4 and the guide section 6. For this purpose, a bearing (not shown) may also be fitted onto the shaft portion 8 of the rolling member 4. In this case, a bearing whose curvature radius is identical to the curvature radius of the bottom surface 7 is mounted on the shaft portion 8.

The inertia body 3 is a damper mass that suppresses vibrations resulting from torque pulse by an inertia torque thereof established according to a mass and an acceleration. The inertia body 3 comprises an annular second plate 10 that is arranged concentrically with the rotary member 2, and a center hole 11 that is formed around the rotational center L1. A diameter of the center hole 11 of the inertia body 3 is larger than an outer diameter of the first plate 5 of the rotary member 2 so that the rotary member 2 and the inertia body 3 are allowed to rotate relative to each other without interference. A plurality of cutouts 12 are formed in a radially inner portion of the second plate 10 in such a manner as to open on an inner circumferential side at regular intervals in the circumferential direction. As described, the inertia body 3 is situated around the rotary member 2 so that each of the guide sections 6 holding the rolling member 4 therein is individually situated within the cutout 12. Specifically, an opening width of each of the cutouts 12 is wider than a design value of an oscillation range of the rolling member 4 in the circumferential direction.

A bulging section 13 is formed on radially outer side of each of the cutouts 12 to jut out to both sides in the axial direction from the inertia body 3, and arcuate inner surfaces of each of the bulging section 13 serve as a raceway surface 14 respectively. A projection width of the bulging section 13 in the axial direction is wider than a thickness of the diametrically large section 9 of the rolling member 4, and a curvature radius of the raceway surface 14 is shorter than a curvature radius of an outer circumference of the bulging section 13 from the rotational center axis L1. When the rotary member 2 is rotated at a speed higher than a certain level, the rolling members 4 held in the guide sections 6 of the rotary member 2 are centrifugally displaced toward radially outer side. Consequently, the diametrically large section 9 of each of the rolling members 4 is individually brought into contact with the raceway surface 14 of the inertia body 3. In this situation, given that a normal line of the diametrically large section 9 of the rolling member 4 coincides with a direction of application of the centrifugal force, the rolling member 4 is stabilized at a central portion 14a of the raceway surface 14 which is farthest from the rotational center axis L1. When each of the rolling members 4 is individually stabilized at the central portion 14a of each of the raceway surfaces 14, the rotary member 2 and the inertia body 3 are brought into a neutral state. In this situation, specifically, the rolling member 4 is merely pushed onto the raceway surface 14 by the centrifugal force without applying torque to the inertia body 3.

In other words, the rotary member 2 and the inertia body 3 are connected to each other through the rolling members 4 in such a manner that the rotary member 2 and the inertia body 3 are returned to the neutral state where a relative angle (or a phase difference) between the rotary member 2 and the inertia body 3 is zero.

The inertia body 3 comprises an adjuster portion 15 formed between the raceway surfaces 14 to adjust a position of the rolling member 4 in the axial direction. As shown in FIG. 2, a thickness of the adjuster portion 15 is thicker than thicknesses of the first plate 5 and the guide section 6 of the rotary member 2. Specifically, the adjuster portion 15 is a plate portion protruding radially inwardly toward the cutout 12 from the inertia body 3 between the raceway surfaces 14. A thickness of the adjuster portion 15 is thickest at the radially outermost portion, and is substantially identical to or slightly thicker than a clearance between the diametrically large sections 9 of the rolling member 4. The thickness of the adjuster portion 15 is reduced gradually from the radially outermost portion toward a radially inner most portion, and the thickness of the radially inner most portion of the adjuster portion 15 is substantially identical to a thickness of the first plate 5 of the rotary member 2. That is, each surface of the adjuster portion 15 is inclined toward a thickness center. Therefore, if the rolling member 4 is displaced in the axial direction when centrifugally displaced radially outwardly, one of the diametrically large sections 9 is brought into contact with the adjuster portion 15 so that the rolling member 4 is isolated away from the inclined surface of the adjuster portion 15 in the axial direction. Consequently, the rolling member 4 is positioned at an axial center in the guide section 6 across the adjuster portion 15.

When the rolling member 4 rolls on the raceway surface 14 away from the central portion 14a, the inertia body 3 is oscillated relative to the rotary member 2 by a torque derived from the centrifugal force so that the central portion 14a of the raceway surface 14 is brought into contact with the rolling member 4 again. In the neutral state where a relative angle between the rotary member 2 and the inertia body 3 is zero and hence the inertia body 3 is in phase with the rotary member 2, the rolling member 4 is situated at the radially outermost position. In this situation, therefore, the shaft portion 8 of the rolling member 4 is isolated away from the bottom surface 7 of the guide section 6. When the torque applied to the rotary member 2 changes, the inertia body 3 will inertially stay at a previous position with respect to the rotary member 2 so that a relative rotation is caused between the rotary member 2 and the inertia body 3. Consequently, the rolling member 4 being pushed onto the raceway surface 14 rolls from the central portion 14a toward any one of circumferential ends of the raceway surface 14. Since the raceway surface 14 has a curvature in which the central portion 14a is situated at the radially outermost position, the rolling member 4 rolling on the raceway surface 14 away from the central portion 14a is pushed radially inwardly by the raceway surface 14 toward the bottom surface 7 of the guide section 6. A travelling distance of the rolling member 4 in the radial direction when pushed radially inwardly by the raceway surface 14 is governed by a curvature of the raceway surface 14 and an angle of the relative rotation between the rotary member 2 and the inertia body 3. Specifically, the distance of such inward movement of the rolling member 4 is increased with an increase in the angle of the relative rotation between the rotary member 2 and the inertia body 3. One example to reduce or damp a collision noise resulting from collision of the rolling member 4 against the bottom surface 7 of the guide section 6 is shown in FIG. 4.

Figure 4:
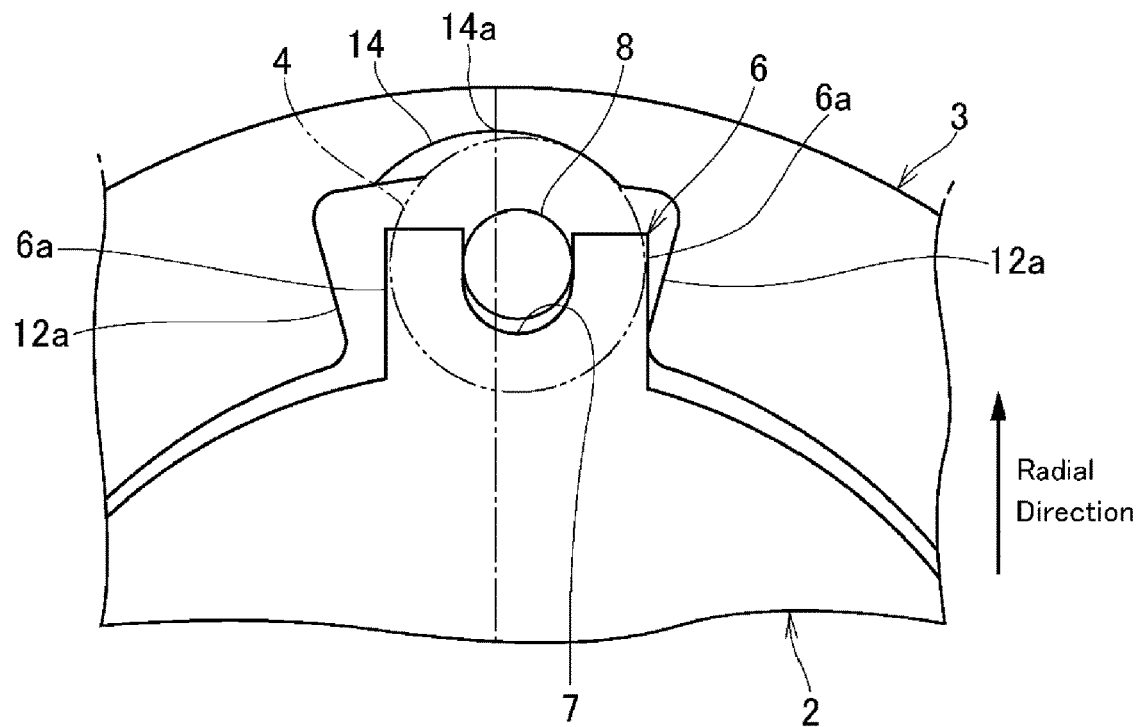
FIG. 4 is a partial front view showing an example to restrict a relative rotation between the rotary member and the inertia body by contacting a side surface of a guide section with a side surface of the cutout.

According to the example shown in FIG. 4, a side surface 6a of the guide section 6 is brought into contact with a side surface 12a of the cutout 12 to establish a reaction force to restrict a relative rotation between the rotary member 2 and the inertia body 3. Accordingly, the side surface 6a of the guide section 6 serves as a first contact portion and the side surface 12a of the cutout 12 serve as a second contact portion of the example shown in FIG. 4, and the first contact portion and the second contact portion serve as a restriction mechanism of the embodiment. Specifically, a clearance between the side surface 6a of the guide section 6 and the side surface 12a of the cutout 12 is set in such a manner that (the shaft portion 8 of) the rolling member 4 centrifugally pushed onto the raceway surface 14 will not be brought into contact with the bottom surface 7 of the guide section 6 by the raceway surface 14, even when the inertia body 3 rotates relative to the rotary member 2 to an extent that the side surface 12a of the cutout 12 is brought into contact with the side surface 6a of the guide section 6. That is, given that the rotary member 2 and the inertia body 3 are in the neutral state, the clearance between the side surface 6a of the guide section 6 and the side surface 12a of the cutout 12 is narrower than a required distance of the relative rotation between the side surface 6a of the guide section 6 and the side surface 12a of the cutout 12 in a direction to push the rolling member 4 to the bottom surface 7 of the guide section 6 by the raceway surface 14. In other words, the restriction mechanism is configured to restrict the relative rotation between the rotary member 2 and the inertia body 3 by bringing the guide section 6 into contact with the cutout 12, before the rolling member 4 is brought into contact with the bottom surface 7 of the guide section 6 by the raceway surface 14. According to the example shown in FIG. 4, therefore, the rolling member 4 centrifugally pushed onto the raceway surface 14 will not be pushed back to the bottom surface 7 as the radially inner limit position of the guide section 6 even if the torque applied to the rotary member 2 changes. For this reason, collision noise generated in the torsional vibration damper 1 can be reduced.

Figure 5:
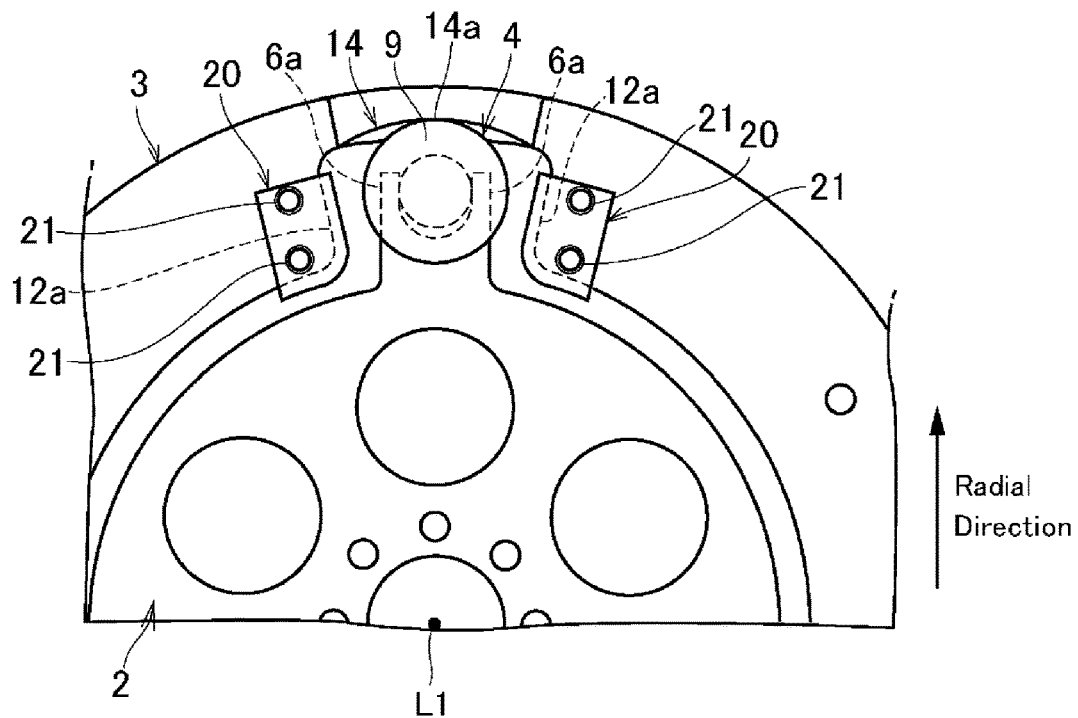
FIG. 5 is a partial front view showing an adapter attached to the notch.
Figure 6:
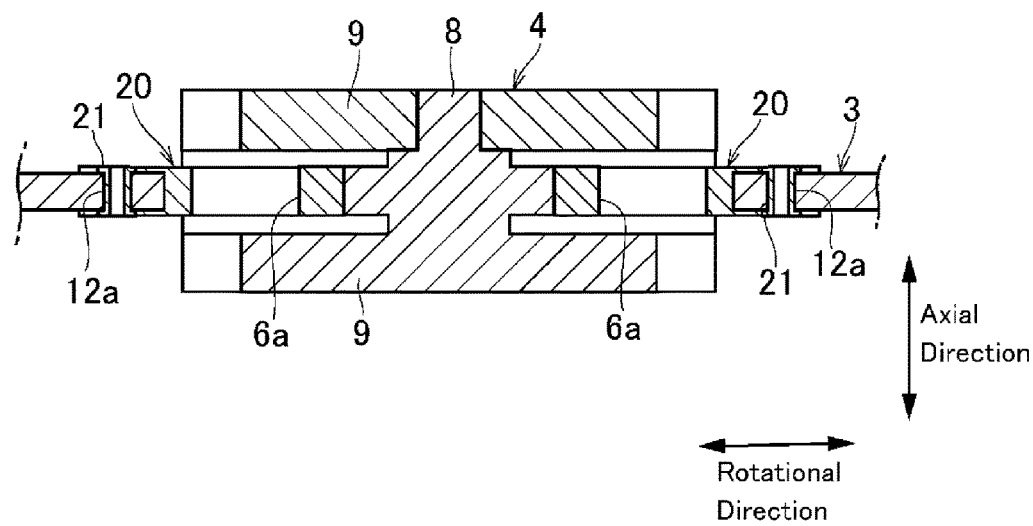
FIG. 6 is a partial cross-sectional view showing a cross-section of the adapter shown in FIG. 5.

As illustrated in FIGS. 5 to 12, the relative rotation between the rotary member 2 and the inertia body 3 may also be restricted using an adapter. One example of the adapter is shown in FIGS. 5 and 6. According to the example shown in FIGS. 5 and 6, an adapter 20 as a plate member is attached to the inertia body 3 in such a manner as to protrude from the side surface 12a of the cutout 12 of the inertia body 3 toward the guide section 6 of the rotary member 2. Specifically, a thickness of the adapter 20 is substantially identical to a thickness of the second plate 10 of the inertia body 3, and thicker than a clearance between the diametrically large sections 9 of the rolling member 4. For example, the adapter 20 may be made of elastic material such as synthetic resin. Given that the rotary member 2 and the inertia body 3 are in the neutral state, a clearance created between the adapter 20 and the side surface 6a of the guide section 6 is substantially identical to the clearance between the side surface 6a of the guide section 6 and the side surface 12a of the cutout 12 in the example shown in FIG. 4.

The adapter 20 may be attached to the inertia body 3 by an appropriate means. For example, in the example shown in FIGS. 5 and 6, the adapter 20 is formed with a substantially U-shaped cross-section so that the side surface 12a of the cutout 12 is inserted into a hollow space of the adapter 20. The adapter 20 thus fitted onto the side surface 12a of the cutout 12 is fixed to the inertia body 3 by a rivet 21.

In the situation shown in FIGS. 5 and 6, a relative rotation between the rotary member 2 and the inertia body 3 is not caused, and hence the rotary member 2 and the inertia body 3 are in the neutral state. In this situation, the guide section 6 of the rotary member 2 is isolated away from both of the adapters 20 attached to the side surfaces 12a of the cutout 12. In this situation, if the torque applied to the rotary member 2 changes, the inertia body 3 is oscillated by such torque change and the guide section 6 is moved in either direction. Consequently, the rolling member 4 rolls along the raceway surface 14 while being pushed toward the bottom surface 7 of the guide section 6. However, the adapter 20 comes into contact with the side surface 6a of the guide section 6 to restrict the relative rotation between the rotary member 2 and the inertia body 3, before the shaft portion 8 of the rolling member 4 comes into contact with the bottom surface 7 of the guide section 6. That is, the rolling member 4 will not be brought into contact with the bottom surface 7 of the guide section 6.

Optionally, as shown in FIG. 5, the adapter 20 may be provided with a projection protruding toward the center hole 11 of the second plate 10 of the inertia body 3. In this case, when the rotational speed of the rotary member 2 is reduced and the inertia body 3 drops gravitationally, the inertia body 3 will come into contact indirectly with the circumferential portion of the rotary member 2 through the adapter 20. Since the adapter 20 is made of elastic material, collision noise resulting from collision of the inertia body 3 against the rotary member 2 made of metal may be absorbed by the adapter 20.

Figure 7:
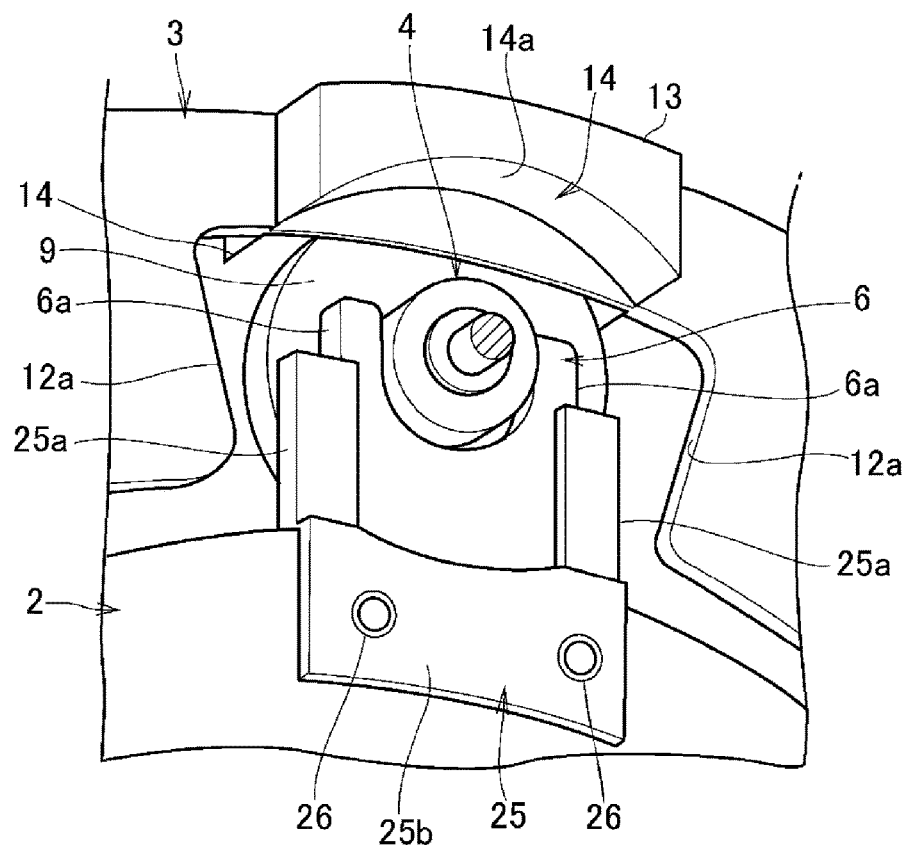
FIG. 7 is a partial perspective view showing an adapter attached to a guide section.
Figure 8:
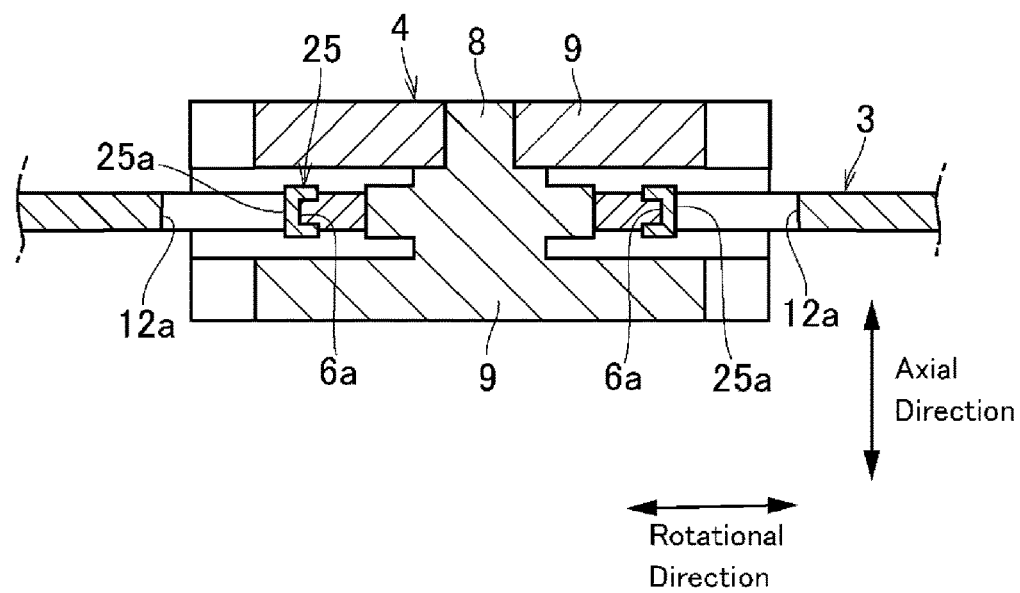
FIG. 8 is a partial cross-sectional view showing a cross-section of the adapter shown in FIG. 7.

Another example of the adapter is shown in FIGS. 7 and 8. According to the example shown in FIGS. 7 and 8, an adapter 25 is attached to the rotary member 2. The adapter 25 comprises a base portion 25b fixed to the rotary member 2, and a pair of covering portions 25a protruding from the base portion 25b to cover each of the side surfaces 6a of the guide section 6 respectively. Specifically, the base portion 25b as a plate portion is contacted to an outer circumferential portion of the first plate 5 of the rotary member at radially inner side of the guide section 6, and fixed by a rivet 26. In order to use the adapter 25 as a buffer member, it is also preferable to use elastic material to form the adapter 25. A clearance between the covering portion 25a of the adapter 25 and the side surface 12a of the cutout 12 is set in such a manner that the covering portion 25a comes into contact with the side surface 12a of the cutout 12 before the rolling member 4 comes into contact with the bottom surface 7 of the guide section 6, when a relative rotation is caused between the rotary member 2 and the inertia body 3 in the neutral state.

In the situation shown in FIGS. 7 and 8, a relative rotation between the rotary member 2 and the inertia body 3 is not caused, and hence the rotary member 2 and the inertia body 3 are in the neutral state. In this situation, the covering portions 25a attached to the guide section 6 of the rotary member 2 are isolated away from both of the side surfaces 12a of the cutout 12. In this situation, if the torque applied to the rotary member 2 changes, the inertia body 3 is oscillated by such torque change and the guide section 6 is moved in either direction. Consequently, the rolling member 4 rolls along the raceway surface 14 while being pushed toward the bottom surface 7 of the guide section 6. However, the covering portion 25a of the adapter 25 attached to the guide section 6 comes into contact with the side surface 12a of the cutout 12 to restrict the relative rotation between the rotary member 2 and the inertia body 3, before the shaft portion 8 of the rolling member 4 comes into contact with the bottom surface 7 of the guide section 6. That is, the rolling member 4 will not be brought into contact with the bottom surface 7 of the guide section 6.

The restriction mechanism may also be configured to restrict the relative rotation between the rotary member 2 and the inertia body 3 by gradually increasing the reaction force to restrict the relative rotation with an increase in an angle of the relative rotation. According to the example shown in FIG. 9, an elastic member 30 is arranged in each clearance between the side surface 6a of the guide section 6 and the side surface 12a of the cutout 12 opposed thereto. For example, a compression coil spring or a helical extension coil spring may be adopted as the elastic member 30. Specifications of both of the elastic members 30, e.g., lengths of the elastic members 30 are identical to each other so as to establish elastic forces of same magnitude. When the rotary member 2 and the inertia body 3 are in the neutral state, therefore, the elastic forces applied to the guide section 6 from the elastic members 30 of both sides are in balance, and the diametrically large section 9 of the rolling member 4 is contacted with the radially outermost position of the raceway surface 14. When a relative rotation between the rotary member 2 and the inertia body 3 is caused, the guide section 6 is pushed back by one of the elastic members 30 being compressed so that the rotary member 2 and the inertia body 3 are returned to the neutral state. That is, the elastic force is applied to the guide section 6 by one of the elastic members 30 being compressed in a direction to reduce an angle of relative rotation between the rotary member 2 and the inertia body 3.

Figure 9:
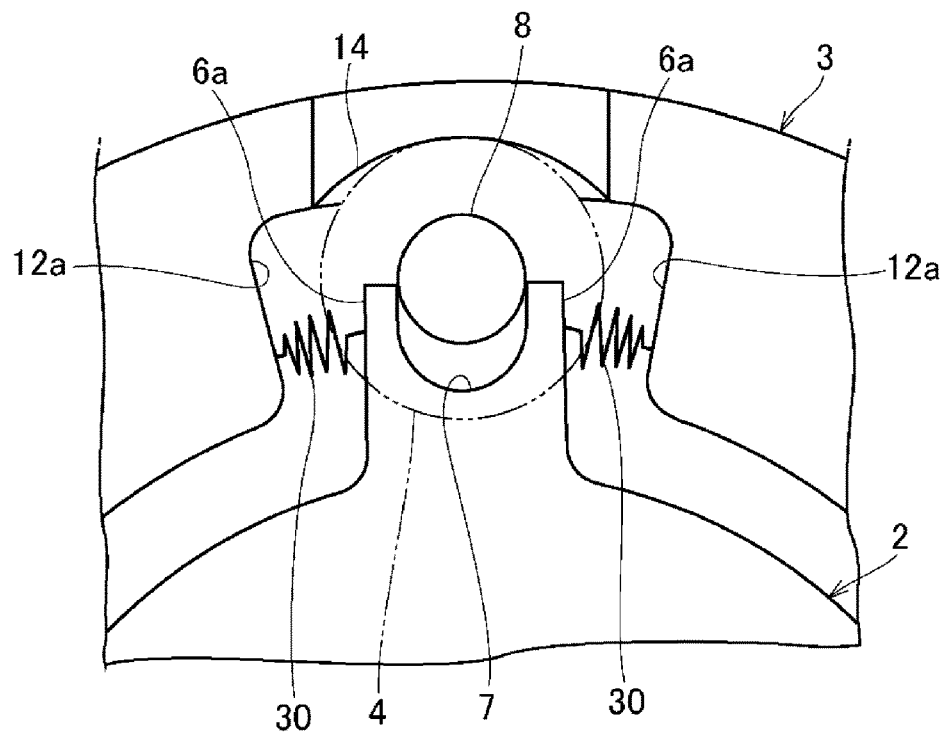
FIG. 9 is a partial front view showing a coil spring for restricting a relative rotation between the inertia body and the rotary member.

According to the example shown in FIG. 9, the elastic force of the elastic member 30 as a restriction force to restrict the relative rotation between the rotary member 2 and the inertia body 3 is increased with an increase in the angle of relative rotation between the rotary member 2 and the inertia body 3. That is, a speed of the relative rotation between the rotary member 2 and the inertia body 3 is reduced gradually. When the relative rotation between the rotary member 2 and the inertia body 3 is caused, the rolling member 4 is pushed radially inwardly by the raceway surface 14 toward the bottom surface 7 of the guide section 6 at a speed in accordance with the speed of the relative rotation between the rotary member 2 and the inertia body 3. However, since the speed of the relative rotation between the rotary member 2 and the inertia body 3 is reduced gradually by the elastic member 30, the speed of the radial movement of the rolling member 4 is also reduced gradually with an increase in the angle of relative rotation between the rotary member 2 and the inertia body 3. Consequently, a collision impact of the rolling member 4 against the bottom surface 7 of the guide section 6 is reduced. For this reason, collision noise in the torsional vibration damper 1 can be reduced and damages on the rolling member 4 and the guide section 6 of the rotary member 2 can be limited.

Figure 10:
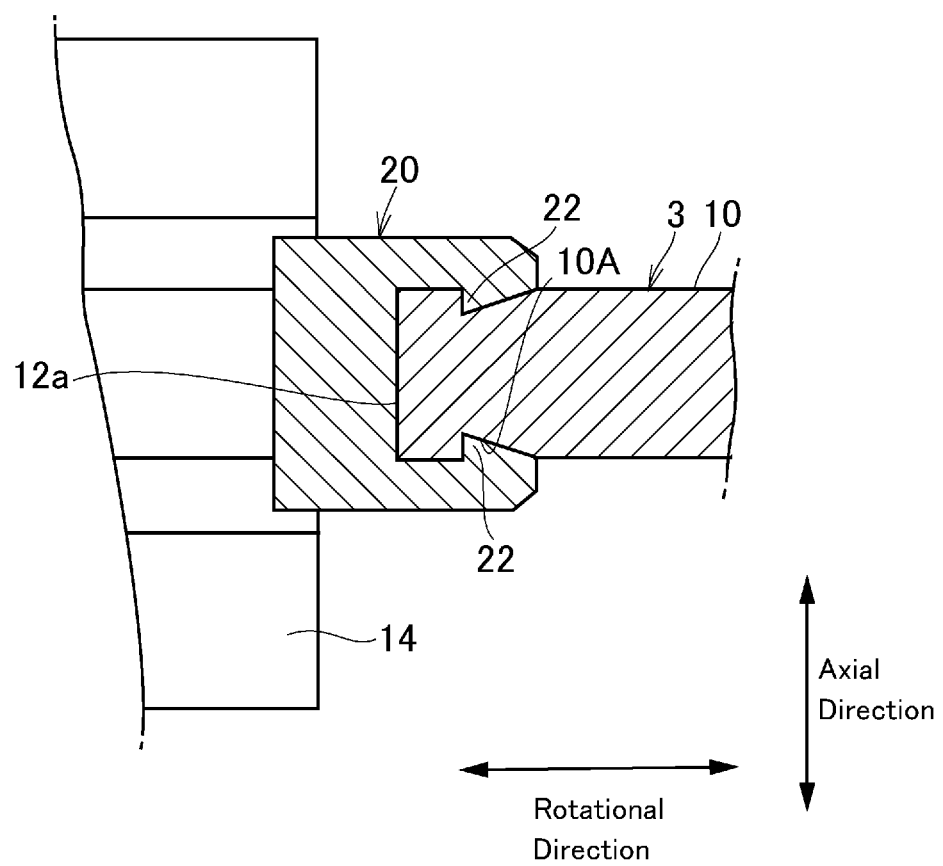
FIG. 10 is a partial cross-sectional view showing an installation example of the adapter.

Here will be explained an installation example of the adapter 20 to the inertia body 3 with reference to FIG. 10. According to the example shown in FIG. 10, a hook 22 is formed on an edge of each inner surface of the adapter 20, and a notch 10A to which the hook 22 is engaged is formed on each surface of the second plate 10 of the inertia body 3, e.g., in the vicinity of the side surface 12a of the cutout 12. A clearance between the hooks 22 is narrower than a thickness of an edge portion of the second plate 10 of the inertia body 3. However, as described, the adapter 20 is made of the elastic or flexible material so that the opening of the adapter 20 is widened to allow the edge portion of the second plate 10 of the inertia body 3 into the hollow space of the adapter 20. The hooks 22 are not necessarily to be engaged tightly with the notches 10A, and it is preferable to fit the hooks 22 loosely with the notches 10A thereby allowing the adapter 20 to move slightly in the rotational direction. In this case, the adapter 20 is allowed to serve as a buffer member to absorb a collision impact against the guide section 6 of the rotary member 2.

Figure 11:
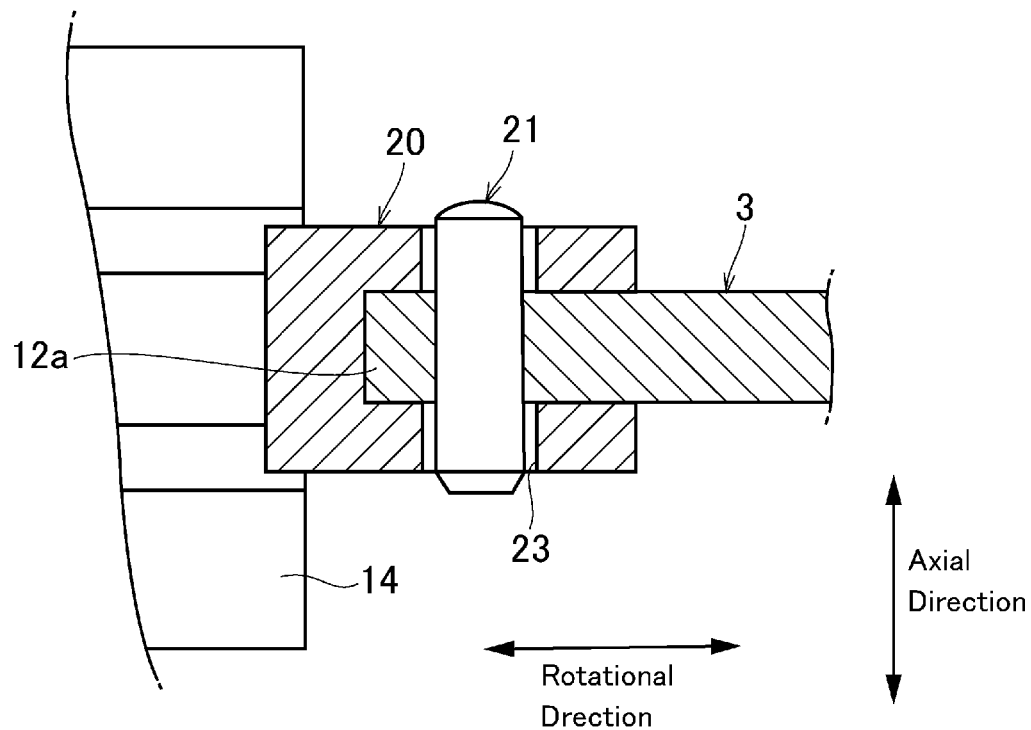
FIG. 11 is a partial cross-sectional view showing another installation example of the adapter.

FIG. 11 shows another installation example of the adapter 20 in which the adapter 20 is attached loosely to the inertia body 3 by a rivet (or a knock pin) 21. According to the example shown in FIG. 11, the rivet 21 is driven tightly into the second plate 10 of the inertia body 3 through a rivet hole 23 formed on each wall portion of the adapter 20. However, as illustrated in FIG. 11, an inner diameter of each of the rivet holes 23 is individually larger than an outer diameter of the rivet 21 so that the adapter 20 is allowed to move within a clearance between the inner diameter of the rivet hole 23 and the outer diameter of the rivet 21. According to the example shown in FIG. 11, therefore, a collision impact resulting from a collision of the inertia body 3 against the guide section 6 of the rotary member 2 can be absorbed.

Figure 12:
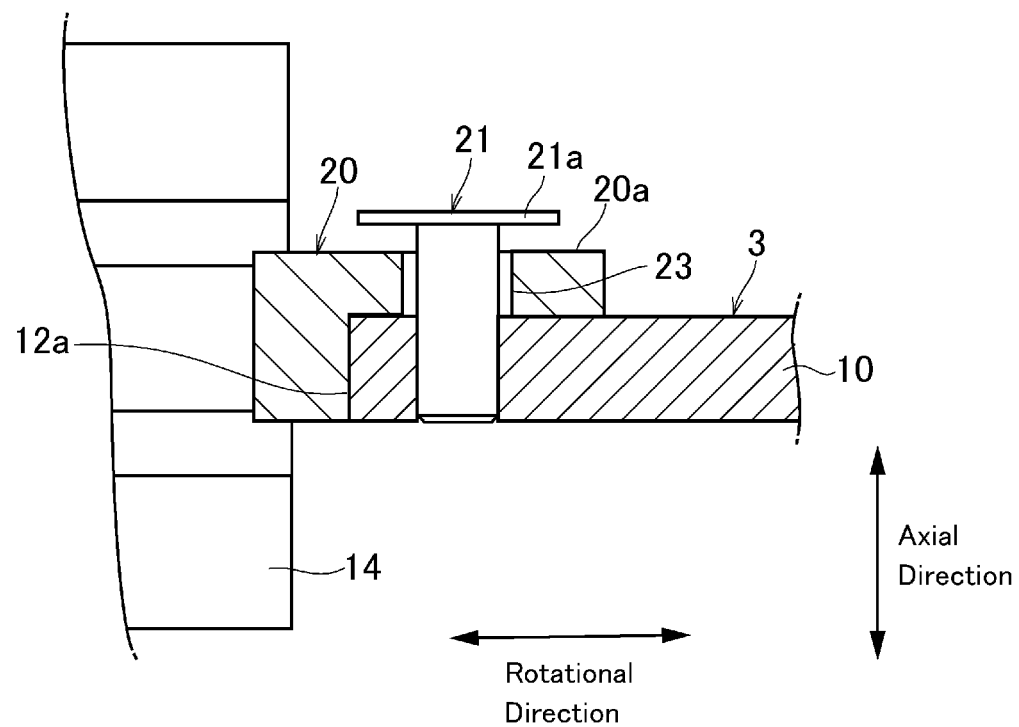
FIG. 12 is a partial cross-sectional view showing still another installation example of the adapter.

FIG. 12 shows still another installation example of the adapter 20 to the inertia body 3. According to the example shown in FIG. 12, the adapter 20 has only one installation wall 20a, and the installation wall 20a is fixed to one surface of the second plate 10 of the inertia body 3 by a rivet 21 having a head 21a. As illustrated in FIG. 12, the inner diameter of the rivet hole 23 is also larger than the outer diameter of the rivet 21 so that the adapter 20 is allowed to move within the clearance between the inner diameter of the rivet hole 23 and the outer diameter of the rivet 21. According to the example shown in FIG. 12, therefore, the collision impact resulting from a collision of the inertia body 3 against the guide section 6 of the rotary member 2 may also be absorbed.

Since the rotary member 2, the inertia body 3, and the rolling member 4 are required to have sufficient strength, stiffness, specific gravity etc., the rotary member 2, the inertia body 3, and the rolling member 4 are made of metallic material. Therefore, comparatively large noise may be generated when the shaft portion 8 of the rolling member 4 comes into contact with the bottom surface 7 of the guide section 6 of the rotary member. On the other hand, the adapter 20 is not necessarily to be as hard as the rotary member 2, the inertia body 3, and the rolling member 4. Therefore, the adapter 20 made of elastic material may also be adapted to avoid direct contact between the shaft portion 8 of the rolling member 4 and the bottom surface 7 of the guide section 6 of the rotary member 2.

Figure 13:
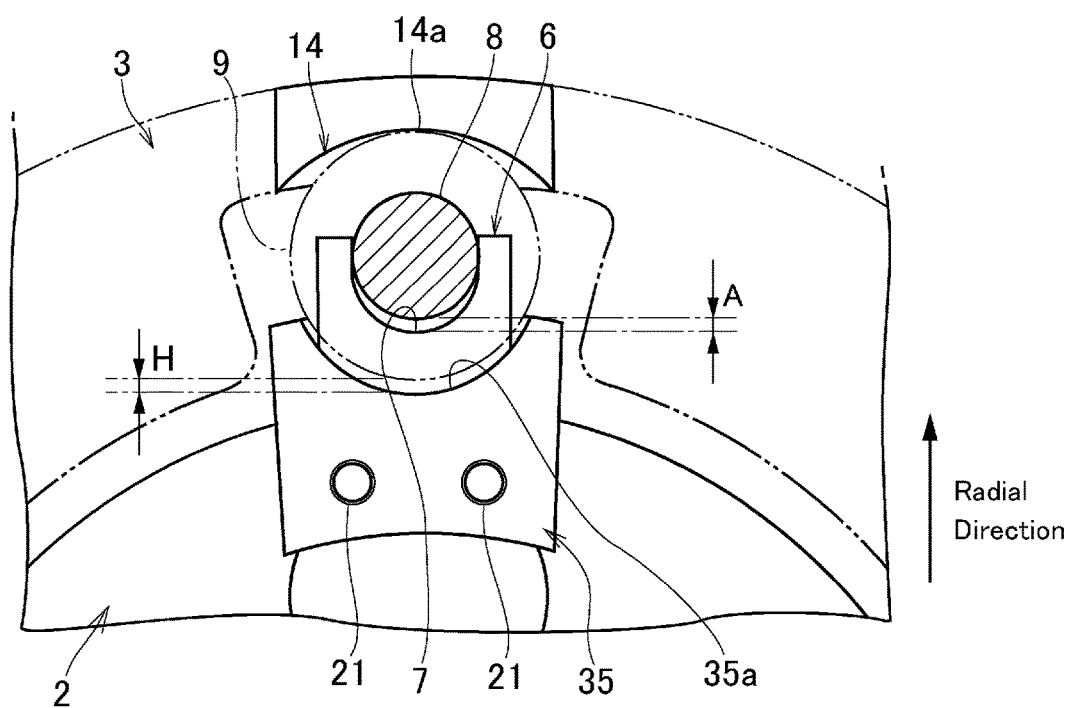
FIG. 13 is a partial front view showing another example of the adapter.

Turning to FIG. 13, there is shown another example of the adapter that is adapted to avoid direct contact between the shaft portion 8 of the rolling member 4 and the bottom surface 7 of the guide section 6 of the rotary member 2. According to the example shown in FIG. 13, an adapter 35 also made of flexible or elastic material is attached to the first plate 5 of the rotary member 2 at a portion of radially inner side of the guide section 6 so as to restrict a radial movement of the rolling member 4 toward the bottom surface 7 of the guide section 6 of the rotary member 2. That is, the adapter 35 is situated at radially inner side of the diametrically large section 9 of the rolling member 4, and a stopper surface 35a of the adapter 35 is formed to be opposed to the diametrically large section 9 of the rolling member 4. Specifically, a curvature radius of the stopper surface 35a is substantially identical to a curvature radius of the diametrically large section 9 of the rolling member 4. According to the example shown in FIG. 13, when the rolling member 4 centrifugally pushed onto the raceway surface 14 of the inertia body 3 is pushed radially inwardly by the raceway surface 14 or attracted by the gravity, the stopper surface 35a of the adapter 35 is brought into contact with the diametrically large section 9 of the rolling member 4 before the shaft portion 8 of the rolling member 4 comes into contact with the bottom surface 7 of the guide section 6. That is, the rolling member 4 is maintained to a position away from the bottom surface 7 of the guide section 6 by the stopper surface 35a of the adapter 35. To this end, specifically, the stopper surface 35a is formed in such a manner that a clearance H between the stopper surface 35a and the diametrically large section 9 of the rolling member 4 is set narrower than a clearance A between the shaft portion 8 of the rolling member 4 being pushed onto the central portion 14a of the raceway surface 14 and the bottom surface 7 of the guide section 6. According to the example shown in FIG. 13, therefore, the shaft portion 8 of the rolling member 4 can be prevented from being contacted to the bottom surface 7 of the guide section 6.

For this reason, it is possible to avoid generation of metallic noise resulting from collision of the shaft portion 8 of the rolling member 4 against the bottom surface 7 of the guide section 6. Thus, the adapter 35 may also serve as a buffer member. The adapter 35 may also be attached to the shaft portion 8 of the rolling member 4, or to both of the rotary member 2 and the rolling member 4. According to the example shown in FIG. 13, the above-mentioned restriction mechanism including the first contact portion the second contact portion may be omitted.

Figure 14:
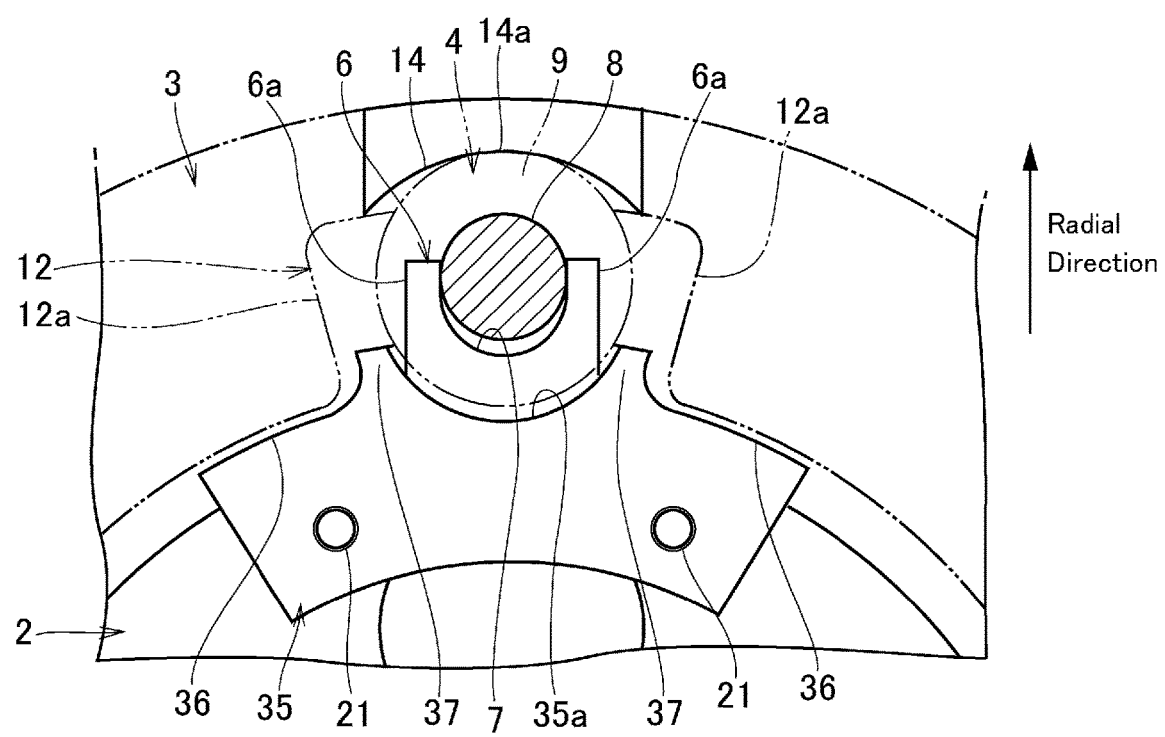
FIG. 14 is a partial front view showing still another example of the adapter.
Figure 15:
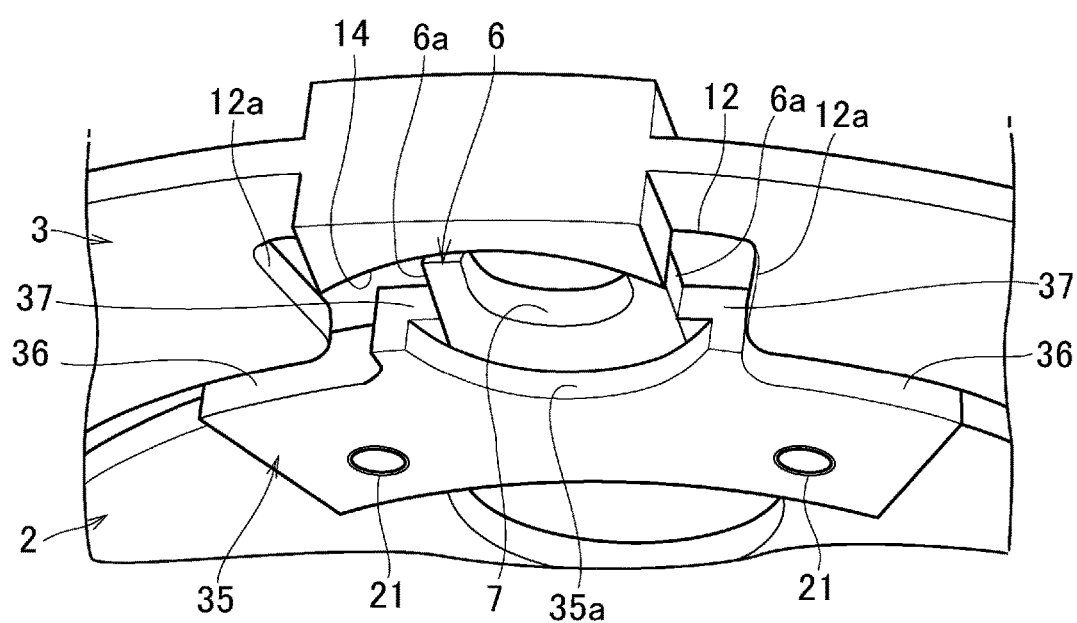
FIG. 15 is a partial perspective view showing the adapter shown in FIG. 14.

As illustrated in FIGS. 14 and 15, the adapter 35 may also be adapted to restrict the relative rotation between the rotary member 2 and the inertia body 3. According to the example shown in FIGS. 14 and 15, the adapter 35 comprises a covering portion 36 extending along the circumference of the rotary member 2 on both sides of the guide section 6, and a pair of radial projections 37 individually extending radially outwardly on both sides of the guide section 6. That is, the covering portion 36 reduces the clearance between the outer circumference of the rotary member 2 and the inner circumference of the inertia body 3. According to the example shown in FIGS. 14 and 15, therefore, the inertia body 3 dropping gravitationally comes into contact with the covering portion 36 of the adapter 35. That is, the inner circumferential edge of the inertia body 3 will not be contacted directly to the rotary member 2.

The radial projection 37 is interposed between each clearance between the side surface 6a of the guide section 6 and the side surface 12a of the cutout 12. When a relative rotation between the rotary member 2 and the inertia body 3 is caused, one of the side surfaces 12a of the cutout 12 is brought into contact with one of the radial projections 37 thereby restricting the relative rotation between the rotary member 2 and the inertia body 3. That is, an angle of the relative rotation between the rotary member 2 and the inertia body 3 will not be increased any more. According to the example shown in FIGS. 14 and 15, therefore, the shaft portion 8 of the rolling member 4 will not be brought into contact with the bottom surface 7 of the guide section 6. For this reason, collision noise resulting from collision of the rolling member 4 against the rotary member 2 can be reduced.

Figure 16:
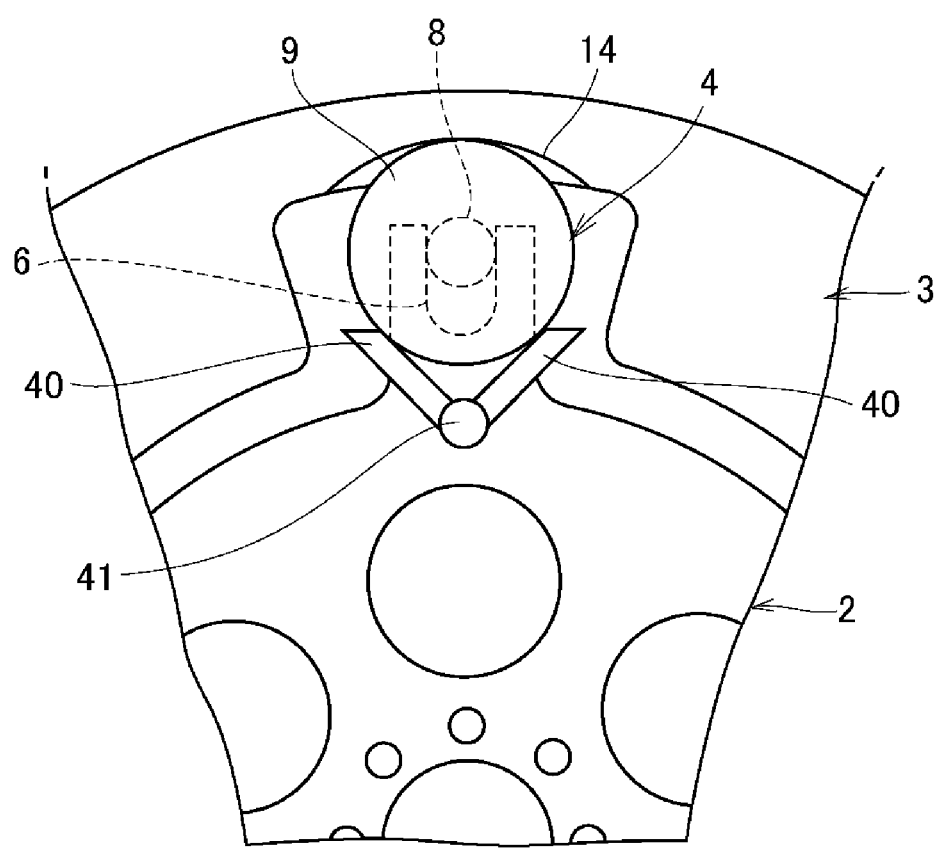
FIG. 16 is a partial front view showing a pair of levers supporting the rolling member.
Figure 17:
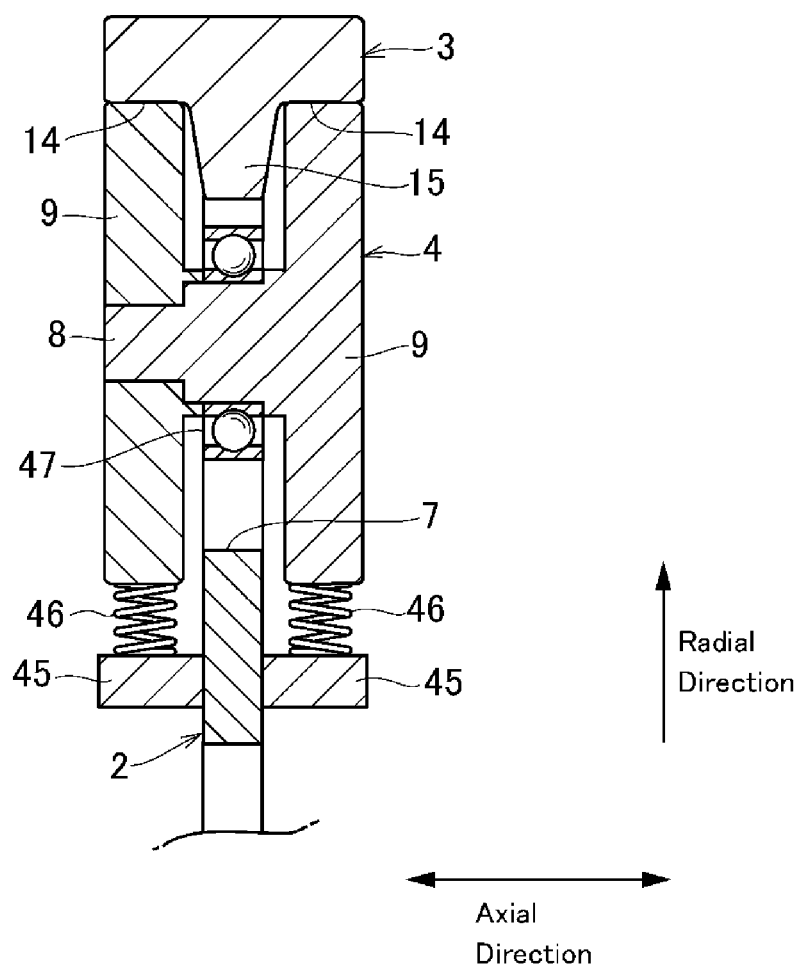
FIG. 17 a partial cross-sectional view showing a coil spring supporting the rolling member.

Turning to FIGS. 16 and 17, there are shown another examples to prevent a collision of the shaft portion 8 of the rolling member 4 against the bottom surface 7 of the guide section 6 or to absorb the collision impact resulting from collision of the shaft portion 8 of the rolling member 4 against the bottom surface 7 of the guide section 6. According to the example shown in FIG. 16, a pair of levers 40 sustains the diametrically large section 9 of the rolling member 4 from radially inner side. Specifically, one end of each of the levers 40 is individually connected to a joint pin 41 arranged at radially inner side of the guide section 6 in a pivotal manner so that the levers 40 form a V-shaped buffer mechanism. Each of the levers 40 is individually pushed by an elastic member (not shown) such as a spring in a direction to close the buffer mechanism. That is, the buffer mechanism is elastically opened by the diametrically large section 9 of the rolling member 4 pushed radially inwardly by the raceway surface 14. In other words, the diametrically large section 9 of the rolling member 4 is held elastically by the levers 40.

According to the example shown in FIG. 16, when the rolling member 4 centrifugally pushed onto the raceway surface 14 of the inertia body 3 is pushed radially inwardly by the raceway surface 14 or drops gravitationally, the levers 40 are opened by the rolling member 4. In this situation, the diametrically large section 9 of the rolling member 4 is pushed radially outwardly by a reaction force resulting from opening the levers 40 against the elastic force closing the levers 40. According to the example shown in FIG. 16, therefore, the rolling member 4 is sustained at a position not to be contacted to the bottom surface 7 of the guide section 6. Nonetheless, even if the rolling member 4 comes into contact with the bottom surface 7, a speed of the rolling member 4 is reduced by the levers 40. For these reasons, collision noise and impact resulting from collision of the shaft portion 8 of the rolling member 4 against the rotary member 2 can be reduced.

In turn, according to the example shown in FIG. 17, an elastic force is applied directly to the rolling member 4. Specifically, a pedestal 45 protruding in the axial direction is attached to the rotary member 2 at radially inner side of the bottom surface 7 of the guide section 6 while being opposed to the diametrically large section 9 of the rolling member 4, and a coil spring 46 is individually interposed between the outer circumferential face of each of the diametrically large section 9 and the pedestal 45. A radially outer end of the coil spring 46 may be contacted to the outer circumferential face of the diametrically large section 9 not only always, but also only when the rolling member 4 is pushed radially inwardly. According to the example shown in FIG. 17, a bearing 47 is fitted onto the shaft portion 8 of the rolling member 4.

Thus, according to the example shown in FIG. 17, the rolling member 4 is pushed radially outwardly by the coil springs 46. According to the example shown in FIG. 17, therefore, the shaft portion 8 of the rolling member 4 will not be brought into contact with the bottom surface 7 of the guide section 6. For this reason, collision noise resulting from collision of the rolling member 4 against the rotary member 2 can be reduced. In the cases of arranging the levers 40 and the coil springs 46, the above-mentioned restriction mechanism including the first contact portion the second contact portion may be omitted according to need.

Figure 18:
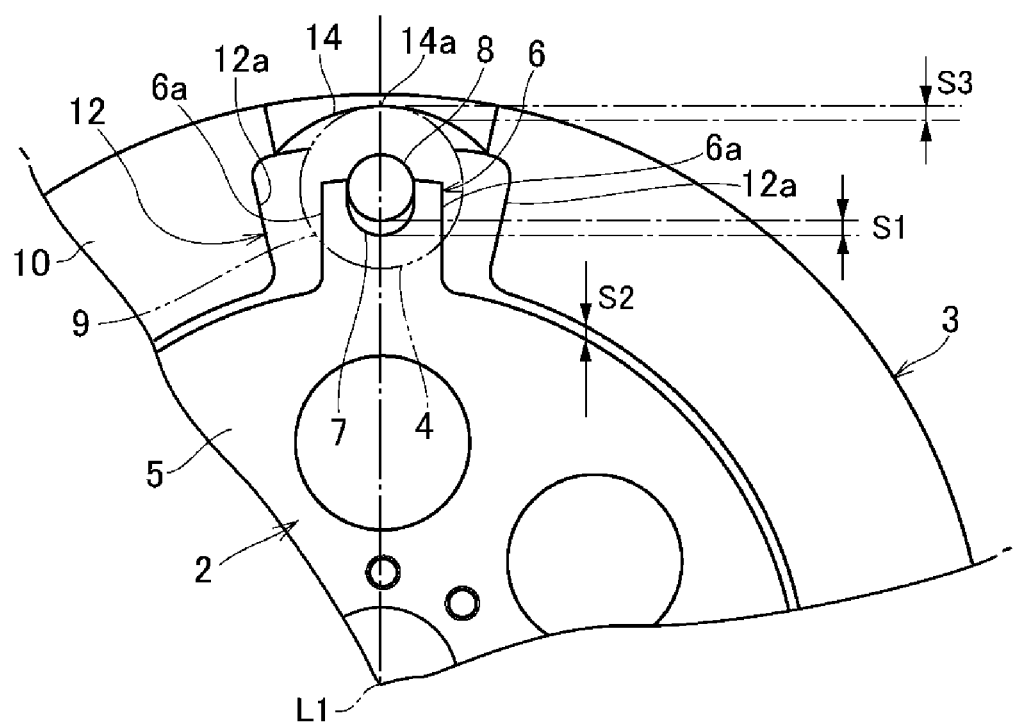
FIG. 18 is a partial front view showing a situation in which the rotary member and the inertia body are situated at neutral positions.

As described, the rolling member 4 centrifugally pushed onto the raceway surface 14 of the inertia body 3 is pushed back radially inwardly by the raceway surface 14 due to eccentricity between the rotary member 2 and the inertia body 3 resulting from the relative rotation therebetween. FIG. 18 illustrates a situation in which the rotary member 2 is rotated at a speed higher than the certain level so that the rotary member 2 and the inertia body 3 are in the neutral state. In this situation, each of the rolling members 4 is centrifugally pushed onto the radially outermost position of each of the raceway surfaces 14, and a clearance between the shaft portion 8 of the rolling member 4 and the bottom surface 7 of the guide section 6 is increased to a maximum clearance S1. By contrast, a clearance between the outer circumference of the first plate 5 of the rotary member 2 and the inner circumference of the second plate 10 of the inertia body 3 measured e.g., in a direction parallel to a moving direction of the rolling member 4 is a minimum clearance S2. A displacement of the rolling member 4 being pushed radially inwardly by the raceway surface 14 is governed by the curvature radius of the raceway surface 14 and the angle of the relative rotation between the rotary member 2 and the inertia body 3. For example, when the angle of the relative rotation between the rotary member 2 and the inertia body 3 is increased to a maximum extent, the displacement of the rolling member 4 is increased to a maximum displacement S3. According to the exemplary embodiment, those dimensions are set in such a manner as to satisfy the following inequality expression:

$$S1 \geq S2+S3.$$

Specifically, given that the rotary member 2 is rotated at a speed higher than the certain level so that the rotary member 2 and the inertia body 3 are in the neutral state, the clearance between the shaft portion 8 and the bottom surface 7 is wider than a total distance of: the minimum clearance S2 between the rotary member 2 and the inertia body 3 situated concentrically with each other measured in the direction parallel to the moving direction of the rolling member 4; and the maximum displacement S3 of the rolling member 4 pushed radially inwardly by the raceway surface 14.

That is, when the inertia body 3 drops gravitationally while rotating relatively with respect to the rotary member 2, the rolling member 4 is pushed radially inwardly toward the bottom surface 7 of the guide section 6 by the raceway surface 14 and the inertia body 3 in a total distance of the minimum clearance S2 and the maximum displacement S3. However, the total distance of the minimum clearance S2 and the maximum displacement S3 is shorter than maximum clearance S1. Therefore, the shaft portion 8 of the rolling member 4 will not be brought into contact with the bottom surface 7 of the guide section 6 even if the rolling member 4 is pushed radially inwardly by the raceway surface 14 and the inertia body 3 to the maximum extent. For this reason, collision noise resulting from collision of the rolling member 4 against the rotary member 2 can be reduced.

Although the above exemplary embodiments of the present disclosure have been described, it will be understood by those skilled in the art that the present disclosure should not be limited to the described exemplary embodiments, and various changes and modifications can be made within the scope of the present disclosure. For example, the forgoing examples may be combined arbitrarily as long as without causing a confliction. In addition, a pair of rails or rods may be adopted as the guide section. Further, the minimum clearance may also be measured at other clearance between the rotary member 2 and the inertia body 3 depending on configurations of those members.

What is claimed is:

1. A torsional vibration damper, comprising:
   a rotary member that is rotated by a torque applied thereto;
   an inertia body that oscillates relatively to the rotary member in response to a change in the torque so as to suppress torsional vibrations resulting from the change in the torque;
   a rolling member that is rotated with the rotary member while being displaced radially outwardly by a centrifugal force;
   a guide section that is formed on the rotary member to hold the rolling member, while allowing the rolling member to move radially outwardly from a predetermined radially inner limit position of the guide section but restricting the rolling member to move in a circumferential direction; and
   a raceway surface as an arcuate surface formed on the inertia body to which the rolling member is centrifugally brought into contact,
   wherein the raceway surface is adapted to push the rolling member toward a radially inner limit position against the centrifugal force when a relative rotation between the rotary member and the inertia body is caused,
   the torsional vibration damper further comprises a restriction mechanism that establishes a restriction force in a direction to restrict the relative rotation between the rotary member and the inertia body, when the rolling member centrifugally pushed onto the raceway surface is pushed radially inwardly by the raceway surface toward the radially inner limit position of the guide section, wherein the restriction mechanism includes
a first contact portion that is formed on the rotary member while being oriented to a rotational direction of the rotary member, and
a second contact portion that is opposed to the first contact portion while maintaining a predetermined clearance from the first contact portion to be brought into contact with the first contact portion, when the relative rotation between the rotary member and the inertia body is caused so that the rolling member is pushed radially inwardly by the raceway surface, and
the predetermined clearance between the first contact portion and the second contact portion is narrower than a required distance of a relative rotation between the first contact portion and the second contact portion to push the rolling member to the radially inner limit position of the guide section by the raceway surface that is governed by an angle of the relative rotation between the rotary member and the inertia body.

2. The torsional vibration damper as claimed in claim 1,
wherein the guide section is formed on an outer circumference of the rotary member to protrude radially outwardly,
the inertia body includes a cutout that holds the guide section, and the cutout includes a side surface opposed to the guide section in the rotational direction of the rotary member,
a side surface of the guide section held in the cutout serves as the first contact portion,
the side surface of the cutout opposed to the side surface of the guide section serves as the second contact portion, and
at least one of the first contact portion and the second contact portion comprises an adapter protruding toward the other one of the first contact portion and the second contact portion.

3. The torsional vibration damper as claimed in claim 2, wherein the adapter is made of elastic material.

4. The torsional vibration damper as claimed in claim 3, wherein the adapter includes a stopper portion that is brought into contact with a part of the rolling member thereby maintaining the rolling member to a position away from the radially inner limit position of the guide section.

5. The torsional vibration damper as claimed in claim 2, wherein the adapter includes a stopper portion that is brought into contact with a part of the rolling member thereby maintaining the rolling member to a position away from the radially inner limit position of the guide section.

6. A torsional vibration damper, comprising:
a rotary member that is rotated by a torque applied thereto;
an inertia body that oscillates relatively to the rotary member in response to a change in the torque so as to suppress torsional vibrations resulting from the change in the torque;
a guide groove having a bottom surface at a predetermined radial position, that is formed on an outer circumference of the rotary member to protrude radially outwardly;
a rolling member that is rotated with the rotary member while being displaced radially outwardly by a centrifugal force, and that includes a shaft portion held in the guide groove while being allowed to move in a radial direction but restricted to move in a rotational direction of the rotary member, and a pair of weight portions formed on both ends of the shaft portion; and
a raceway surface as an arcuate surface formed on the inertia body to which the rolling member is centrifugally brought into contact,
wherein the raceway surface is adapted to push the rolling member toward the bottom surface of the guide groove against the centrifugal force when a relative rotation between the rotary member and the inertia body is caused, and
the torsional vibration damper comprises a buffer member that is attached to any one of the rotary member and the rolling member to maintain the rolling member to a position away from the bottom surface of the guide groove, when the rolling member centrifugally pushed onto the raceway surface is pushed radially inwardly by the raceway surface toward the bottom surface of the guide groove.

7. A torsional vibration damper, comprising:
a rotary member that is rotated by a torque applied thereto;
an inertia body that oscillates relatively to the rotary member in response to a change in the torque so as to suppress torsional vibrations resulting from the change in the torque;
a guide groove having a bottom surface at a predetermined radial position, that is formed on an outer circumference of the rotary member to protrude radially outwardly;
a rolling member that is rotated with the rotary member while being displaced radially outwardly by a centrifugal force, and that includes a shaft portion held in the guide groove while being allowed to move in a radial direction but restricted to move in a rotational direction of the rotary member, and a pair of weight portions formed on both ends of the shaft portion; and
a raceway surface as an arcuate surface formed on the inertia body to which the rolling member is centrifugally brought into contact,
wherein the raceway surface is adapted to push the rolling member toward the bottom surface of the guide groove against the centrifugal force when a relative rotation between the rotary member and the inertia body is caused,
the shaft portion has a circular cross-section;
the bottom surface is shaped into an arcuate surface; and
a curvature radius of the bottom surface is identical to a curvature radius of an outer circumferential surface of the shaft portion.

8. A torsional vibration damper, comprising:
a rotary member that is rotated by a torque applied thereto;
an inertia body that oscillates relatively to the rotary member in response to a change in the torque so as to suppress torsional vibrations resulting from the change in the torque;
a guide groove having a bottom surface at a predetermined radial position, that is formed on an outer circumference of the rotary member to protrude radially outwardly;
a rolling member that is rotated with the rotary member while being displaced radially outwardly by a centrifugal force, and that includes a shaft portion held in the guide groove while being allowed to move in a radial direction but restricted to move in a rotational direction of the rotary member, and a pair of weight portions formed on both ends of the shaft portion; and a raceway surface as an arcuate surface formed on the inertia body to which the rolling member is centrifugally brought into contact, wherein the raceway surface is adapted to push the rolling member toward the bottom surface of the guide groove against the centrifugal force when a relative rotation between the rotary member and the inertia body is caused, and a clearance between the shaft portion and the bottom surface of a case in which the relative rotation between the rotary member and the inertia body is not caused and the rolling member is centrifugally pushed onto the raceway surface is wider than a total distance of: a minimum clearance between the rotary member and the inertia body situated concentrically with each other measured in a direction parallel to a moving direction of the rolling member; and a maximum displacement of the rolling member pushed toward the bottom surface by the raceway surface.

* * * * *